A. W. HAWKINS.
SAFETY GUARD, RELEASE, AND SUPPORT FOR BRAKE BEAMS.
APPLICATION FILED JULY 15, 1920.
1,397,581.
Patented Nov. 22, 1921.
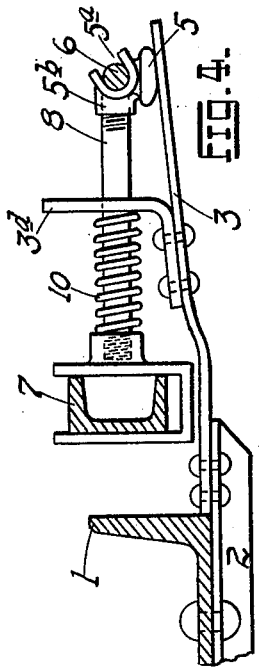
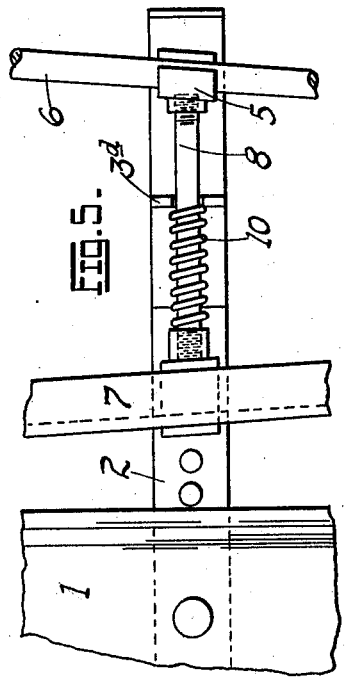
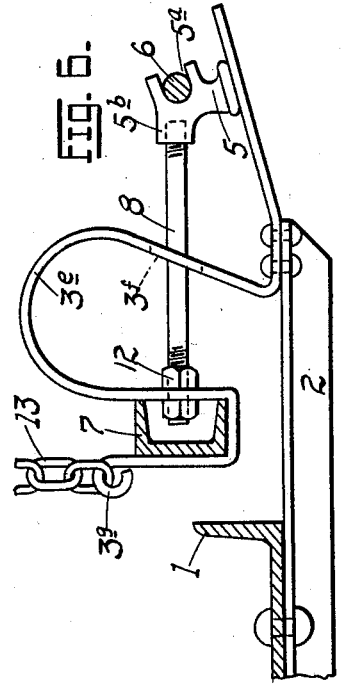
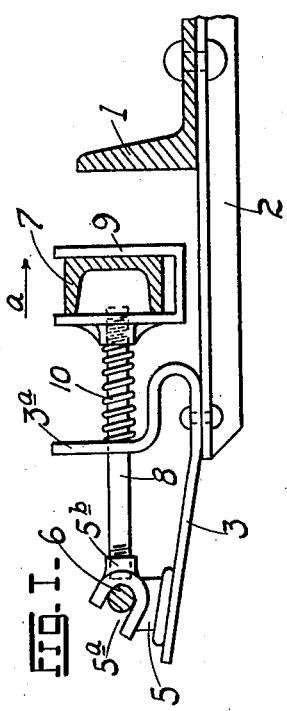
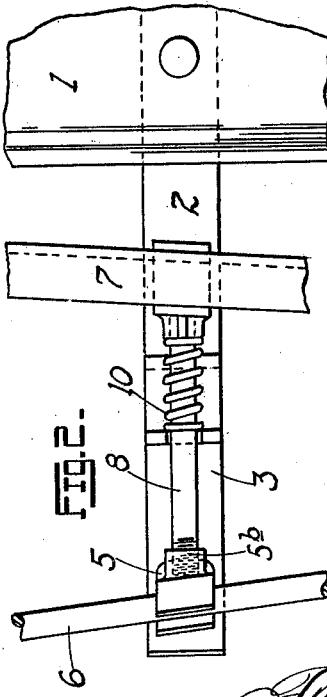
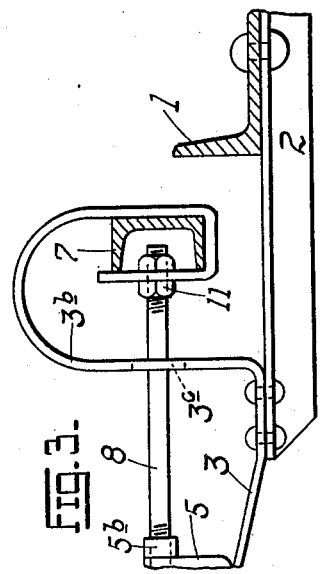
INVENTOR.
Arthur W. Hawkins.
BY
ATTORNEY.

UNITED STATES PATENT OFFICE.

ARTHUR W. HAWKINS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SAFETY-GUARD, RELEASE, AND SUPPORT FOR BRAKE-BEAMS.

1,397,581.   Specification of Letters Patent.   Patented Nov. 22, 1921.

Application filed July 15, 1920. Serial No. 396,448.

*To all whom it may concern:*

Be it known that I, ARTHUR W. HAWKINS, a citizen of the United States, residing at Chicago, Illinois, have invented a certain new and useful Improvement in Safety-Guards, Releases, and Supports for Brake-Beams, of which the following is a full, clear, and exact description, such as will enable others skilled in the art to which it appertains to make and use the same, reference being had to the accompanying drawings, forming part of this specification, in which—

Figure 1 is a side elevational view of my improved safety guard release and support for brake beams.

Fig. 2 is a top plan view of the form shown in Fig. 1.

Fig. 3 is a side elevational view of a modified form of my invention.

Fig. 4 is a side elevational view of another modified form of my invention.

Fig. 5 is a top plan view of the form shown in Fig. 4.

Fig. 6 is a side elevational view of another modified form of my invention.

This invention relates to a new and useful improvement in a safety guard, releasing device and support for brake beams, the object being to combine the elements containing these features in what might be designated as a single device.

The advantage of such a structure containing all of these features is that the truck can be equipped with this combination, and any of the several well known and commonly used types or forms of trussed brake beams can be applied without necessitating the removal or dismantling of any of the parts of the above mentioned combination. Furthermore, the combination can be applied to the spring planks of existing forms of trucks.

My present improvement is adapted for use as a third point support for brake beams as well as a fourth point support, the latter being the form which is shown in the drawings.

In the drawings, 1 indicates the spring plank of a car truck and 2 a safety bar, preferably in the form of an angle iron secured to the spring plank and extending on each side thereof, said bar possessing sufficient rigidity to hold and support the brake beam and prevent it from falling in the event that its hangers or supporting devices are lost or disabled. This rigid safety bar constitutes an element of safety which prevents the brake beam from falling onto the track and thereby avoids derailment.

3 indicates an inclined track support which is preferably yielding and which is secured to the end of the rigid safety bar 2. This inclined track support is designed to coöperate with the third or fourth point support for the brake beam. This support or sliding chair is indicated at 5, and, as before stated, in the particular form of my invention shown in the drawings, this sliding bar is in the nature of a fourth point support. The chair or support 5 is preferably in the form of a casting having an open-ended angularly disposed slot or recess 5$^a$ in its upper end, designed to receive the tension rod 6 of a trussed brake beam of which the compression member in the form of a channel is indicated at 7.

5$^b$ indicates an inwardly extending boss formed on the support or sliding chair 5, which boss is preferably threaded and receives and coöperates with the threaded outer end of the rod 8.

In the form shown in Figs. 1 and 2, the inner end of the inclined track member 3 is bent upwardly as at 3$^a$ so as to provide a mount for the rod 8, said rod having its inner end threaded into an opening in one of the legs of the U-shaped beam engaging member 9. A spring 10 is arranged on the inner end of rod 8 and interposed between the beam engaging member 9 and the upwardly extending member 3$^a$. This spring 10 serves as a releasing spring tending to move the brake beam in the direction of the arrow A, Fig. 1, and so retract said beam, forcing the brake shoes carried by the beam away from the wheels.

In the construction above described, the member 3$^a$ is preferably formed with the slot, open at its upper end, to receive the rod 8 and by this construction, it is possible to apply the sliding chair or brake beam support and brake engaging member 9, to the brake beam when the same is either hung or dismantled, adjusting the chair 5 and brake beam engaging member 9 relative to each other on the rod 8 by means of the threaded engagement between said rod and said parts, and when the parts are so assembled on the beam, the beam may be dropped in position from above, the rod 8 passing through the slot in the member 3ª—the spring 10, of course, being compressed to permit the beam to be thus hung, after which the spring is released.

In the form shown in Fig. 3, I have shown the inner end of the track member 3 as being bent upwardly and around the compression member of the brake beam, thus forming a bow spring 3ᵇ which serves as a releasing spring. The end of this bow spring has the rod 8 secured thereto by means of nuts 11, and the bow spring is preferably provided with an elongated opening 3ᵉ through which the rod 8 passes.

In Figs. 4 and 5, I have shown a structure similar to that shown in Figs. 1 and 2 except that instead of bending the inner end of the track 3 upwardly, a separate member 3ᵈ is secured to the track.

In Fig. 6 I have shown a form of my invention in which the release spring is in the form of a bow 3ᵉ having a vertically elongated opening 3ᶠ for the passage of the rod 8. The inner end of this bow spring having the rod 8 secured thereto by means of nuts 12 while the extremity of the bow spring which forms the beam engaging member terminates in an eye 3ᵍ to which a safety chain 13 may be secured.

What I claim is:—

1. A fourth point support for brake beams comprising a tension rod engaging member and a compression member engaging member detachably connected together.

2. A fourth point support for brake beams comprising a tension rod engaging member and a compression member engaging member adjustably connected together.

3. A fourth point support for brake beams comprising a connecting rod or member, a tension rod engaging member having threaded engagement with one end of said connecting rod, and a compression member engaging member connected to the other end of said connecting rod.

4. A fourth point support for brake beams comprising a connecting rod or member, a tension rod engaging member carried by one end of said connecting rod, and a compression member engaging member having threaded engagement with the other end of said connecting rod.

5. A fourth point support for brake beams having a tension rod engaging member and a compression member engaging member connected together and having seats for said tension rod and compression member, which seats are open at one side for quick detachment and attachment.

6. A fourth point support for brake beams having a tension rod engaging member and a compression member engaging member connected together and having seats for said tension rod and compression member, which seats are open at one side for quick detachment and attachment, and one of said seats being angularly disposed.

7. A fourth point support for brake beams comprising a rod having a tension rod engaging member at one end and a compression member engaging member at the other end, said engaging members being adjustable relative to each other and said tension rod engaging member being provided with a wear shoe or rubbing surface.

8. A fourth point support for brake beams comprising a tension rod engaging member, a compression member engaging member, adjustable means for connecting said engaging members together, and a brake release spring coöperating with one of said engaging members to retract the brakes.

9. A fourth point support for brake beams comprising a tension rod engaging member, a compression member engaging member, a rod connecting said engaging members, and a spring adapted to coöperate with one of said engaging members and with a truck member to release the brake beam.

10. The combination of a rigid safety bar, an inclined beam supporting track, a tension rod engaging member having a wear shoe or slide for engaging said track, a compression member engaging member, a rod for connecting said engaging members, a release spring for coöperating with one of said engaging members, and a guide for said rod.

11. The combination of a safety bar, an inclined flexible track, a tension rod engaging member coöperating with said track and provided with an open-ended seat for the tension rod of the beam, a compression member engaging member provided with an open-ended seat for a compression member of the beam, means for connecting said engaging members together, and a guide coöperating with said connecting means.

12. In a third or fourth point support for brake beams, a device adapted to be removably secured at its opposite ends to the compression and tension members respectively of a trussed brake beam and independently of the beam strut, and an element adapted to support said device from a truck member.

13. In a third or fourth point support for trussed brake beams, a device adapted to be applied to both the compression and tension members of a trussed brake beam at a point spaced from the strut of the latter, a brake release spring engaging said device, and an element adapted to be mounted upon a truck member to support said device and to form a seat for said brake release spring.

In testimony whereof I hereunto affix my signature this 7th day of July, 1920.

ARTHUR W. HAWKINS.